_United States Patent Office_

3,232,869
Patented Feb. 1, 1966

3,232,869
METHOD OF PURIFYING AQUEOUS LIQUID
Andrew J. Gard, 12 Orchard St., Wellesley, Mass.
No Drawing. Filed Apr. 4, 1963, Ser. No. 270,515
9 Claims. (Cl. 210—62)

This application is a continuation-in-part of Serial No. 105,901, filed April 27, 1961, now abandoned, which is a continuation-in-part of Serial No. 39,766 filed June 30, 1960, now abandoned.

This invention relates to a method for providing free iodine in aqueous liquid to purify and disinfect.

Prior art techniques of providing free iodine in water bodies for purification have had disadvantages such as requiring unduly frequent addition of materials, involving use of production or materials offensive to sight, smell, or taste, or requiring use of unduly acidic conditions.

I have discovered that free iodine may be very satisfactorily provided, free from all the above disadvantages, by reaction of a peroxygen compound selected from the class consisting of monopersulfates and peroxydisulfates with an iodide, in a solution having a pH from 7 to 8. The reaction is quantitative, so that the amount of free iodine present can be regulated by limiting the quantity of one of the reactants so that only the desired amount of free iodine may be produced. The pH range of 7 to 8 is critical, since at lower and higher pH's the iodine is converted into non-active forms (such as hypoiodites at the higher pH's and iodates at the lower pH's). When I use the expression "neutral" herein, I refer to a pH in the critical range of 7 to 8.

In preferred embodiments in the application of treating bodies of water for human consumption or human immersion, such as municipal water supplies and swimming pools, my invention provides the additional advantage that unusually long duration of free iodine at the desired level may be produced by including iodide ions at the stoichiometric level to produce the desired concentration of free iodine, and adding peroxydisulfate ions in great excess. Since free iodine generated and acting to disinfect reacts to re-form iodide ions (no iodine being lost except through volatilization), it is possible to control iodine content without any addition of any reactant for days or more at a time. This embodiment has the additional advantage of improving reaction kinetics, because of the high concentrations of peroxydisulfate ions present. It is possible to use kinetics to regulate concentration of free iodine according to the invention, in accordance with principles of physical chemistry familiar in the field, but in the preferred embodiments with respect to treating fluids for human consumption or immersion, this control is achieved by holding one ingredient, preferably iodide, at the stoichiometric quantity to give the desired concentration of free iodine ($I_2$).

For treatment of swimming pools or municipal water supply, the American Public Health Association has set 0.2 p.p.m. of free iodine as the minimum. However, lower percentages of free iodine usefully decrease concentration of pathogens and algae.

In treatment of bodies of water for human consumption and bathing and otherwise when short contact time is not a factor, I prefer to use a free iodine concentration in the range of 0.1 to 1.0 p.p.m. I also prefer to use peroxydisulfate ions for reaction which iodide ions; and to minimize providing nutrients for algae, as potassium and ammonium salts do, I prefer to use sodium, magnesium or calcium salts of the iodide and the sodium salt of the peroxydisulfate, as the source of their ions. I also prefer to control the concentration of free iodine by providing a stoichiometric amount of either iodide or peroxydisulfate, and an excess of the other ion for good kinetics; in the most preferred embodiments I use the stoichiometric amount of iodide and an excess of peroxydisulfate, in order to provide increased period of free iodine at the desired level before any additional reactant need be added. In my most preferred embodiment, I provide 0.2 p.p.m. of sodium iodide and at least 5 p.p.m. of sodium peroxydisulfate; the amounts specified give 24 hour free iodine at a level of 0.2 p.p.m., and adding additional amounts of peroxydisulfate give additional duration at said same level of free iodine.

The stoichiometric quantities of iodide ion corresponding to 0.1 p.p.m. and 1.0 p.p.m. free iodine are 0.1 p.p.m. and 1.0 p.p.m., respectively. The stoichiometric quantities of peroxydisulfate ion corresponding to 0.1 p.p.m. and 1.0 p.p.m. free iodine are 0.0756 and 0.756 p.p.m., respectively.

Prior to this invention it was believed that the concentration of iodide and persulfate must be of a predetermined magnitude to give an effective concentration of free iodine and with any lesser concentration, the reactants would remain dormant or the persulfate would dissipate itself by decomposition. This predetermined magnitude was of such a high concentration that it would be necessary to use from 149,930 to 14,993 times the limits of the instant invention for iodide ion concentration and 31,331 to 3,133 times the peroxydisulfate concentration of the present invention, in order for there to be a reaction.

Investigators have proposed metal ion catalysts of the iodine-persulfate reaction but such metal ions as ion and copper cannot be tolerated in swimming pool water or potable water sources.

It is my finding that sunlight and, especially, ultra-violet light, are exceedingly effective as catalysts in potentiating the reaction between iodide ion and persulfate ion. I have measured the rate of the iodide-persulfate reaction in the absence of daylight and ultra-violet light at levels claimed in my invention and have found the reaction remains dormant. Upon exposure to ultra-violet light or natural light e.g., sunlight, the iodide-persulfate reaction response is immediate.

Thus I have perfected a range of reactants involving iodide and peroxydisulfate ions that provide the prescribed diatomic iodine of 0.2 p.p.m. as set forth by the American Public Health Association for purification and continued sterilization of swimming pool water or municipal water supplies. Prior investigators reported on the academic features of the iodide-peroxydisulfate and the concentrations employed are completely intolerable for the end use involving potable water.

It is, therefore, an object of the instant invention to produce a disinfectant for water which can be easily controlled at a predetermined level without the necessity of adding large amounts of disinfectant.

Another object of the instant invention is to provide a means of disinfecting water with free iodine by means of reacting an iodide salt and a peroxygen salt in low concentrations.

A further object of the instant invention is to react an iodide salt with a peroxygen salt at low concentrations by means of ultra-violet light.

A still further object of the instant invention is to disinfect swimming pools and potable water by means of a reaction which produces free iodine in easily controlled concentrations without the necessity of constantly adding more iodide.

Other objects and advantages of the invention will become apparent and will be best understood from the following detailed description as exemplified by the following examples.

*First example.*—An outdoor swimming pool of 26,500 gallon capacity of water was treated with 11.81 grams of sodium iodide (0.1181 p.p.m. of sodium iodide; 0.1 p.p.m. iodide ion) and 1000 grams of sodium peroxydisulfate (10 p.p.m. sodium peroxydisulfate; 8.0 p.p.m. peroxydisulfate ion).

An additional 1220 grams of sodium peroxydisulfate was added every 48 hours over a period of two months. Under intense sunlight and high ambient temperatures a quantity of sodium iodide of 10 to 20 grams was required every 3 or 4 days to replace the free iodine lost by vaporization. These were conditions of the investigation and the free iodine content of the pool water was maintained at 0.1 p.p.m. to 0.12 p.p.m.

Without sunlight the reaction is catalyzed by use of ultra-violet light (GE Sunlamp 275 W, 110–125 v; 60 cycle A.C.) and the free iodine of 0.1 p.p.m. is reached within an hour after the initial addition of the reactants. Control with UV light source is exceedingly uniform and adaptable for indoor pools and bathing during intervals deviod of sunlight.

*Second example.*—An outdoor swimming pool containing 27,000 gallons of water of neutral pH (recirculated through cotton cloth bag filters every two hours for an eight hour period during the day) was treated with 30 grams of sodium iodide (0.295 p.p.m. sodium iodide; 0.25 p.p.m. iodide ion) and 1000 grams of sodium peroxydisulfate (10 p.p.m. sodium peroxydisulfate; 8.0 p.p.m. peroxydisulfate ion) to give a neutral solution. The reaction was

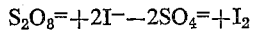

$$S_2O_8^= + 2I^- \rightarrow 2SO_4^= + I_2$$

An additional 100 grams of sodium peroxydisulfate was added every 48 hours over a period of two months, and (under intense sunlight or ultra-violet light and high ambient temperature) 20 to 30 grams of sodium iodide were added every 3 or 4 days to replace iodine lost by vaporization. Concentration of free iodine in the water was maintained in the range of 0.2 p.p.m. to 0.3 p.p.m. over the entire period, this level having been reached within an hour after the initial addition of the reactants.

Amount of free iodine present was determined (as in other determinations of $I_2$ made and referred to in this disclosure) by means of an amperometric titration as described by Marks and Glass in Journal of the American Water Works Association, vol. 34, p. 1227, August 1942, using phenylarsine oxide, which does not react with the peroxygen compound.

In the second example, which is an embodiment of the invention for treating water for human consumption and bathing, iodide ions were provided in stoichiometrical quantity to give the desired free iodine, and peroxydisulfate ions were provided in excess to give duration in time at the desired iodine level and to speed reaction kinetics. In the preferred embodiment I provide 0.25 p.p.m. of iodide ion, and at least 20 times that percentage of peroxydisulfate ion.

*Third example.*—An outdoor swimming pool of 26,500 gallons capacity of water was treated with 59.0 grams of sodium iodide (0.59 p.p.m. sodium iodide; 0.5 p.p.m. of iodide ion) and 1000 grams of sodium peroxydisulfate (10 p.p.m. sodium peroxydisulfate; 7.5 p.p.m. peroxydisulfate ion). The addition of reactants is determined by tests for free iodine and the peroxygen compound.

*Fourth example.*—In the treatment of raw water for potable use it usually requires coagulation, settling and filtration before disinfection with free chlorine. Many sources of water present problems to disinfection with free chlorine and free iodine is ideally suited for purification of water to a degree not obtainable with chlorine. I provide a simple means of generating free iodine within closely controlled limits for disinfection of water through the use of sodium iodide and sodium, calcium or magnesium peroxydisulfate at a pH of 7.0 and 8.0. This means that no pH adjustment is necessary and no corrosive chemicals are used thereby reducing so-called "red water" problems that always plague the use of chlorine.

Per 1000 gallons of water, 2.233 grams of sodium iodide (0.59 p.p.m. sodium iodide; 0.5 p.p.m. iodide ion) and 2.33 grams of sodium peroxydisulfate catalyzed by exposure to ultra-violet light and the reaction sustained by exposure to ultra-violet light. This treatment will provide a constant level of 0.5 p.p.m. of free iodine. (2.33 grams=1.878 p.p.m. peroxydisulfate ion).

*Fifth example.*—Per 1000 gallons af water, 4.47 grams of sodium iodide (1.181 p.p.m. sodium iodide; 1.1 p.p.m. iodide ion) and 4.65 grams of sodium peroxydisulfate (3.75 p.p.m. peroxydisulfate ion) are added and catalyzed by exposure to ultra-violet light. This reaction is sustained by exposure to ultra-violet light and this treatment will provide a constant level of 1.0 p.p.m. of free iodine.

Iodide ions may be introduced from any suitable source. In treatment of water for human consumption and bathing, iodides of sodium, magnesium, and calcium are preferred, as above noted.

Peroxydisulfate and monopersulfate ions may also be introduced from any suitable source. For swimming pool and human consumption uses, I prefer sodium peroxydisulfate. Also especially useful for these purposes are calcium peroxydisulfate and magnesium peroxydisulfate.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well are conjointly cooperative equivalents are, therefore, intended to be embraced by those claims.

I claim:

1. A method of destroying undesirable micro organisms in water, for human consumption and swimming pools, comprising introducing into said water a sufficient amount of an iodide salt and a sufficient amount of peroxygen salt for reaction with the said iodide salt to produce a concentration of iodide ion of from 0.1 to 1.0 part per million of said water, said peroxygen salt being present in a concentration of at least stoichiometrical amounts, said water containing said salts being at a pH of between 7 and 8 and exposing the water containing the salts to an effective amount of ultra-violet rays to maintain the reaction between the iodide salt and the peroxygen salt to form free iodine to destroy said micro organisms.

2. A method of destroying undesirable micro organisms in water, for human consumption and swimming pools, comprising introducing into said water an iodide salt and a peroxygen salt, iodide salt being present in a concentration of from 0.1181 to 1.181 parts per million of said water and said peroxygen salt being present in a concentration of at least stoichiometrical amounts, said water conaining said salt being at a pH of between 7 and 8 and exposing the water containing the salts to an effective amount of ultra-violet rays to maintain the reaction between the iodide salt and the peroxygen salt to form free iodine to destroy said micro organisms.

3. The method of claim 1 in which said iodide salts are selected from the group consisting of sodium, magnesium and calcium.

4. The method of claim 1 wherein said peroxygen salt is selected from the group consisting of sodium monopersulfate, magnesium monopersulfate, calcium monopersulfate, sodium peroxydisulfate, magnesium peroxydisulfate and calcium peroxydisulfate.

5. A method of destroying undesirable microorganisms in water, for human consumption and swimming pools, comprising introducing into said water an iodide salt in an amount of from 0.447 gram per thousand gallons of water to 4.47 grams per thousand gallons of water and a peroxygen salt in at least a stoichiometric amount, said water containing said salts being at a pH of between 7 and 8 and exposing the water containing the salts to an effective amount of ultra-violet rays to maintain the reaction between the iodide salt and the peroxygen salt to form free iodine to destroy said micro organisms.

6. The method of claim 1 wherein the concentration of said iodide ion is 0.5 p.p.m.

7. The process of claim 1 wherein the concentration of free iodine is kept constant by the further addition of peroxygen salt.

8. A method of destroying undesirable micro organisms in water, for human consumption and swimming pools, comprising introducing into said water a sufficient amount of sodium iodide and a sufficient amount of sodium peroxydisulfate for reaction with the said sodium iodide to produce a concentration of iodide ion of from 0.1 to 1.0 part per million of said water, said sodium peroxydisulfate being present in a concentration of at least stoichiometrical amounts, said water containing the salts being at a pH of between 7 and 8 and exposing the water containing the salts to an effective amount of ultra-violet rays to maintain the reaction between the iodide salt and the peroxygen salt to form free iodine to destroy said micro organisms.

9. The method of claim 1 wherein the peroxygen salt is present in the water in the amount of at least 0.0756 to 0.756 part per million.

References Cited by the Examiner
UNITED STATES PATENTS

| | | | |
|---|---|---|---|
| 1,661,640 | 4/1926 | Van Allen | 167—70 |
| 2,802,722 | 8/1957 | Stephanou | 23—114 |
| 2,902,405 | 9/1959 | Carroll et al. | 167—70 |
| 2,988,471 | 6/1961 | Fuchs et al. | 210—62 |
| 3,048,546 | 8/1962 | Lake et al. | 252—186 |

OTHER REFERENCES

Allawala et al., J.A. Ph. A (Scientific Edition), vol. XLII, No. 7, July, 1953, pp. 396–401.

Chambers et al., "Soap and Sanitary Chemicals," 28:10, October 1952, pp. 149–151 and 165, particularly 149 relied upon.

Price, "Per-Acids and Their Salts," published by Longmans, Green and Co., N.Y., 1912, p.p. 32–40 relied upon.

MORRIS O. WOLK, *Primary Examiner.*